Nov. 3, 1942.  C. J. GLASSER  2,300,497
GALVANOMETER
Filed Nov. 26, 1938  2 Sheets-Sheet 1
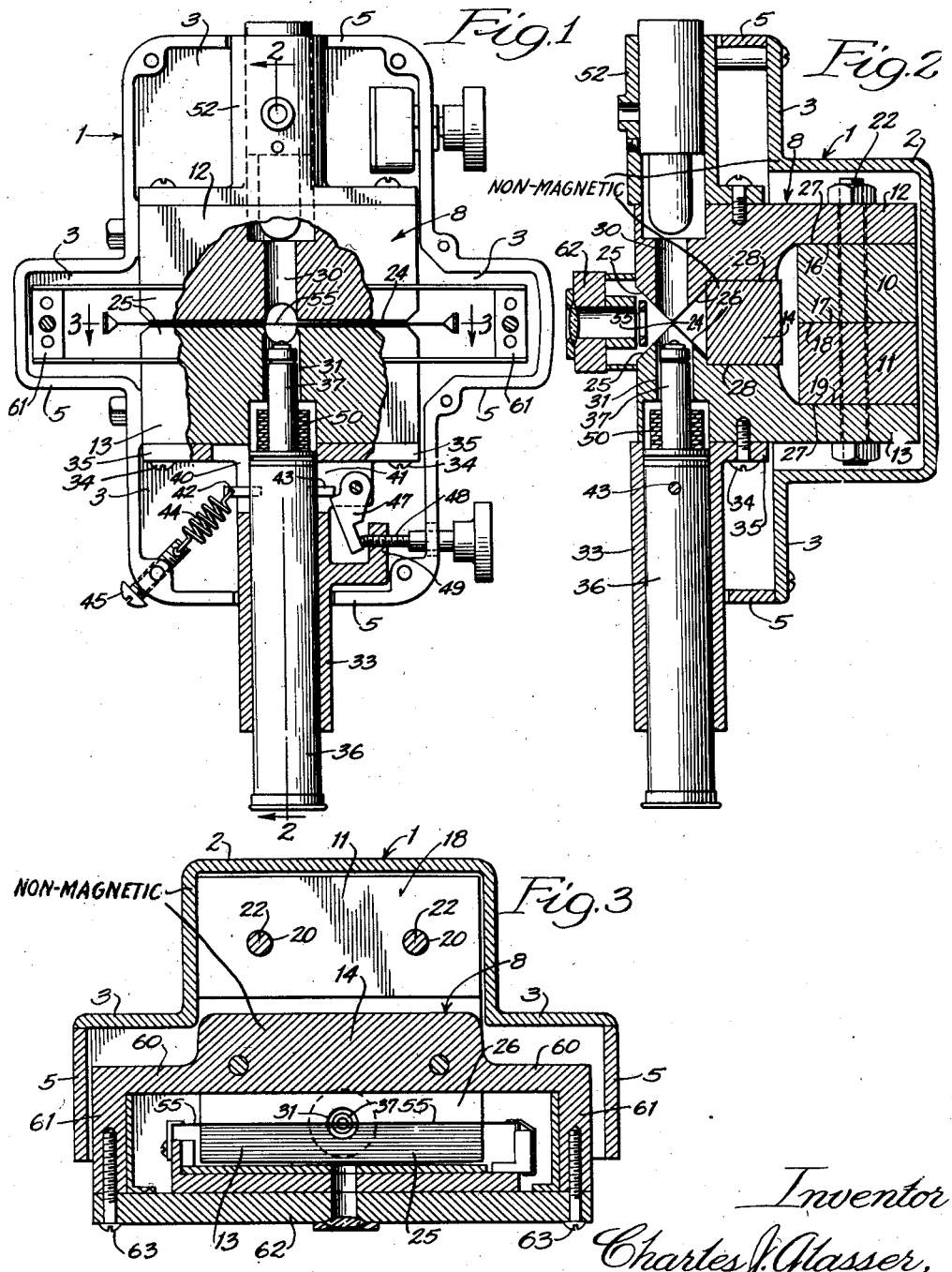
Inventor:
Charles J. Glasser,
By Morris Spector,
Attorney.

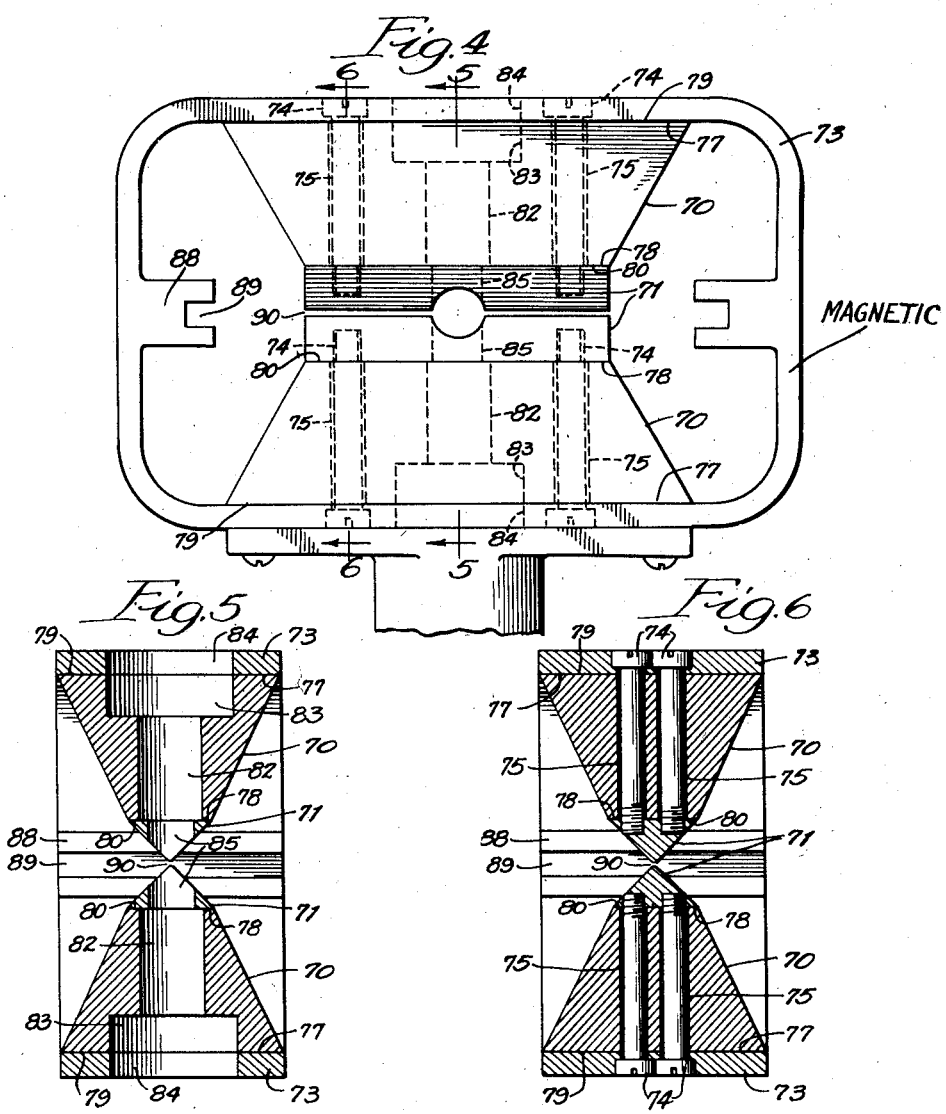

Patented Nov. 3, 1942

2,300,497

UNITED STATES PATENT OFFICE 2,300,497

GALVANOMETER

Charles J. Glasser, Chicago, Ill.

Application November 26, 1938, Serial No. 242,492

1 Claim. (Cl. 171—95)

This invention relates to electro-cardiographs and more particularly to the construction of the galvanometer forming a part thereof.

While the invention is illustrated here as applied to a galvanometer in an electro-cardiograph, it is within the provinces of the present invention to form galvanometers in accordance with the principles of this invention for general use outside of electro-cardiographs. More particularly, the present invention relates to string galvanometers.

In a string galvanometer a wire is tensioned in a magnetic field and the movement of this wire in the field under the action of currents flowing therethrough is a measure of the current flow. In such galvanometers the magnitude of current flow is exceedingly minute and therefore a very high degree of sensitivity is essential, and all extraneous forces which might influence the movement of the galvanometer string or wire must be eliminated. The field strength must be uniformly distributed and must be of a constant magnitude. String galvanometers as heretofore constructed, were provided with an electric field winding for magnetizing the pole structure. The field strength is, of course, a function of the current flow, which, in turn, is a function of the applied voltage. It was essential to maintain a constant voltage across the field winding, which, of course, necessitated the use of power pack, rectifiers and elaborate filters where the source of current is a commercial alternating source. All this adds to the expense of the unit. In addition, such unit is subject to variations in voltage applied to the field winding, due to variations in voltage of the source. In addition to all of the above, the current flowing through the field winding would necessarily heat the winding, changing its resistance and thus changing the amount of current flow. Furthermore, even if current regulators are provided to maintain a constant current flow regardless of the temperature of the field winding, within the temperature range encountered, the field strength would still vary with the temperature since the permeability of the iron structure surrounded by the field changes with change in temperature.

It is on of the objects of the present invention to eliminate all of the above-mentioned difficulties. This result is accomplished by providing a field structure of a string galvanometer with a permanent magnet of sufficient intensity to eliminate the need for an auxiliary magnetizing winding. The field structure constructed in accordance with the present invention includes a permanent magnet comprising an alloy of iron, nickel, aluminum and cobalt as the preferred composition, although any of the magnets described in the patents to Tokushichi Mashina, No. 2,027,994 to 2,028,000 may be used. A magnet made in accordance with the disclosures in the above-mentioned patents is exceedingly hard and therefore exceedingly difficult to machine. It is therefore a further object of the present invention to provide a field structure which includes comparatively soft iron pole shoes, which are rigidly secured to a permanent magnet of the above mentioned character and shaped to provide the requisite pole gap. The pole shoes may be easily machined to shape.

It is a further object of the present invention to provide a field structure for a galvanometer or similar instrument, in which the field strength is uniformly distributed and does not vary with time.

It is a further object of the present invention to provide a galvanometer which may be entirely batteryless and of a sufficient degree of accuracy range to enable its use in an electro-cardiograph.

In considering galvanometers employing an optical system for focusing light from the galvanometer to a photographic sheet, it is essential that the relationship between the optical system and the string of the galvanometer shall not be varied by any causes except the movement of the string itself. In electro-magnetic instruments of the prior art, care must be taken to provide a rigid and massive mounting for the optical system, in order to prevent relative movement of the optical system with respect to the string when the current to the electro-magnet is turned on. At such times strains are produced in the metal which are sufficient to induce an appreciable error in the galvanometer unless a massive, rigid structure is provided to prevent change in alignment of the optical system as the current goes on or off, or as the current diminishes, due to reduced battery voltage. In accordance with the teachings of the present invention, there is no change in magnetic strength such as corresponds to the change in an electro-magnetic type of instrument when the current to the field winding is turned on or off. Since there is no change in magnetic strength, the stresses and strains in the material are of constant magnitude and therefore the optical system can be adjusted for that instrument and there will be no change brought about corresponding to the changes produced by changes in strain in an electro-magnetic type of instrument.

It is a still further object of the present invention to provide an improved means for adjusting the position of the microscope or other parts of the optical system in a galvanometer, especially a string type galvanometer. In accordance with this feature of the present invention, a standard optical system is used, which system is mounted in the magnetic structure and urged in one direction by a spring with a simple screw provided for moving it in opposite direction against action of the spring.

The attainment of the above, and further objects of the present invention will be apparent from the following specification taken in conjunction with the accompanying drawings forming a part thereof.

In the drawings:

Figure 1 is a plan view, in partial section, of a portion of a string galvanometer of an electrocardiograph;

Figure 2 is a sectional view taken along the line 2—2 of Figure 1 and looking in the direction of the arrows;

Figure 3 is a sectional view taken along the line 3—3 of Figure 1 and looking in the direction of the arrows;

Figure 4 is a plan view of a modified form of magnet structure;

Figure 5 is a sectional view taken along the line 5—5 of Figure 4; and

Figure 6 is a sectional view taken along the line 6—6 of Figure 4.

Reference may now be had more particularly to the structure illustrated in Figures 1, 2 and 3. This structure comprises a casing 1 of non-magnetic material, such as, for instance, aluminum, having a rectangular depression or box-like portion 2 and flat rectangular plate-like flanges 3 projecting outwardly at the top of each of the four sides of the box-like portion 2, for receiving a frame 5 which is screwed or otherwise secured to the flanges 3. This frame is also of non-magnetic material such as, for instance, aluminum. A magnet structure and optical system 8 is removably mounted in the box 1 in a manner to be presently described. The magnet structure comprises a pair of rectangular permanent bar magnets 10 and 11, a pair of pole shoes 12 and 13, and a non-magnetic spacer bar 14, of aluminum or the like. The permanent magnets 10 and 11 are of identical construction. They are preferably of iron-aluminum-nickel-cobalt alloy of high permanent magnetic properties, such as is described, for instance, in the United States patent to Ruder, No. 1,968,569, or Mishima, No. 2,027,996, which has been suitably heat treated, as described, for instance, in the United States patent to Ruder, No. 1,947,274, and then magnetized. Permanent magnets of this type are sold under the trade name "Alnico," and contain 5–40% nickel, 7–20% aluminum, .05–30% cobalt, and the remainder substantially iron. The metal is exceedingly hard and can be machined only with great difficulty. Aligned holes 20—20 are formed in each of the magnets during the casting process, by providing suitable cores, in order to avoid the necessity for thereafter forming the holes in this exceedingly hard metal. The surfaces 16, 17, 18 and 19 of each magnet are ground perfectly smooth and flat to form parallel planes. Two bolts 22 preferably, although not necessarily, of non-magnetic material secure the magnets 10—11 and the pole shoes 12—13 together. The nuts on the bolts are drawn exceedingly tight so that there is no air gap between the surfaces 17—18 or between the pole shoes and the magnets. Each of the pole shoes extends forward of the magnets and then towards the other pole shoe, to form a short air gap 24 between the pole shoes. This air gap is preferably of a width of approximately 0.040 inch or less. In order to provide this short air gap and concentrate the flux of the permanent magnet in as narrow a space as possible the faces of the pole shoes are tapered, as indicated at 25—26, so that the minimum air gap 24 is exceedingly narrow, which means that there is a very great concentration of flux at that air gap. The pole shoes are made of iron which is very much softer than the exceedingly hard alloy of the permanent magnets 10—11. This permits machining of the pole shoes to such a size as to obtain exceeding accuracy in the width of the air gap. For this purpose the surfaces 27 and 28 of the pole shoes are machined with a very high degree of accuracy so that the edges of the two pole shoes are opposite and parallel to one another throughout their entire length. The pole shoes are rather long and arranged to locate the air gap 24 at a suitable distance from the permanent magnets so as to reduce the leakage flux. The non-magnetic spacer 14 is machined to the exact dimensions required to maintain the air gap of exactly the requisite size.

The pole shoes 12 and 13 have aligned bores 30 and 31 formed therein to constitute a part of an optical system. A tubular microscope holder 33 is secured to the pole shoes 13 as by screws 34 extending through flanges 35 formed on the holder 33. The microscope holder and the screws are preferably of non-magnetic material. A tubular microscope 36 extends into the holder 33 with a lens holding portion 37 of the microscope extending into the opening 31 in the pole shoe. The microscope 36 is slidable in the holder 33. For this purpose the holder 33 is provided with two oppositely disposed slots 40 and 41 through which extend short pins 42 and 43 that are secured to the microscope 36. A spring 44 is secured to the pin 42 and to an adjusting screw 45 threaded through the frame 5. A cam 47 is pivoted to the microscope holder 33 and bears against the pin 43. A screw 48 is threaded through an arm 49 in the microscope holder 33 and bears against the cam 47. The spring 44 urges the microscope in one direction, as seen in Figure 1, so that the pin 43 of the microscope bears against the cam 47. By adjusting the screw 48, the cam 47 can be turned about its pivot to move the pin 43, and with it the microscope 36, against the action of the spring and in a direction towards the center of the air gap. Suitable packing 50 is provided for preventing vibration or other undesirable movements of the microscope 36. An electric bulb may be located in a tube 52 of non-magnetic material secured to the pole shoe 12 so that the rays of light pass through the opening 30 in the pole shoe to a galvanometer string 55 in the air gap between the pole shoes. The shadow of the galvanometer string, properly focused by the microscope 36, is then photographed upon a moving photographic film at the front of the microscope 36 in a manner well known in the art dealing with electrocardiographs of this type.

The spacer 14 has projections 60—60 from which arms 61—61 extend for receiving a carriage 62 that holds the galvanometer string 55 in place. The carriage 62 may be of any preferred construction, such as is shown, for instance, in the United States patent to Hindle, No. 1,942,027. The carriage is secured to the arm 61 by screws 63, and supports the galvanometer string 55 at exactly the required distance to center the string in the air gap 24. The string 55 comprises generally a quartz string gold plated. Means (not shown) may be provided for altering the tension of the string, as described, for instance, in the above mentioned patent to Hindle, or in the patent to Kruse, No. 1,797,237, issued March 24, 1931. The string tensioning means does not constitute a part of the present invention, and any desired string tensioning means may be used.

The air gap 24 is made as short as possible in order to get the maximum concentration of flux at the air gap and yet it must be wide enough to prevent the formation of any objectionable layers of dust or other foreign material and to prevent any reasonable likelihood that the delicate galvanometer string will contact the magnet structure during the vibration of the string. I have found that an air gap of approximately 0.040 inch is satisfactory. The magnets 10—11 should be of the maximum strength obtainable in order to obtain the maximum possible flux density at the air gap. The flux density at the air gap should be above 10,000 or 12,000 gausses, and preferably above 20,000 gausses. In one instrument which I have made I have obtained a flux density of the air gap of 22,000 gausses which, of course, approaches the magnetic saturation of the iron at the air gap.

Reference may now be had to the magnet structure illustrated in Figure 4. This magnet structure comprises a pair of permanent magnets 70—70 of the same composition as that of magnets 10—11 previously described. A comparatively soft iron pole shoe 71 is secured to the magnet 70, and the two magnets with their pole shoes are assembled in a comparatively soft iron frame 73 of high magnetic permeability, said frame being in the form of a loop. The magnets and the pole shoes are secured to the frame 73 by screws 74 preferably, although not necessarily, of non-magnetic material. The screws pass through oversized holes 75 formed in the magnet 70 during the casting operation, as by the provision of suitable cores, and are threaded into the pole shoe 71. The heads of the screws 74 rest in countersunk holes in the frame 73. The magnets 70 are of the maximum width and the maximum thickness adjacent the frame 73 and taper both as to length and thickness to a minimum length and thickness adjacent the pole shoes 71. The surfaces 77 and 78 of the permanent magnets 70 are ground perfectly flat to constitute parallel planes. The abutting surfaces 79 and 80 of the frame 73 and the pole shoe 71, respectively, are machined very accurately to obtain the requisite spacing of the pole shoes at their tips so that the tip portions of the pole shoes are parallel to one another and exactly the requisite distance apart which, in this instance, is of the order of 0.040 inch. The pole shoes 71 are tapered, as may be seen in Figures 5 and 6, so that the flux of the permanent magnets is concentrated at these pole shoes. Each of the magnets 70 has a hole 82, merging into a larger hole 83, formed therein during the casting process. A similar hole 84 is formed in the frame 73, and a hole 85 is formed in the pole shoe. A microscope may be mounted on the frame 73 to extend into the holes in one of the magnets, in the same manner as illustrated in Figure 1, and a light source may be mounted to direct light through the corresponding holes in the other magnet so that a photograph of the shadow of the string of the galvanometer may be made in the manner well known in the art. The frame 73 has inwardly extending projections 88 at opposite sides thereof, forming grooves or trackways 89 for receiving a carriage which carries a galvanometer string and positions the same centrally in the gap 90 between the pole shoes 71.

In the constructions described, the magnetic field is formed entirely by the permanent magnets. As a result there are no sudden changes in the magnetic field such as result when an electro-magnet is energized and deenergized. Therefore there are no sudden or changing forces tending to throw the optical system out of alignment as in the case of an electrically energized magnet of a string galvanometer, wherein magnetic forces are produced each time the magnet is energized or deenergized.

I claim:

In an electrocardiograph, a strong galvanometer having means for producing a magnetic flux which means comprises a permanent magnet, pole shoes on said magnet forming an air gap and composed of softer material than said magnet, a current carrying string tensioned in the air gap formed by said pole shoes, said permanent magnet and at least one of said shoes having aligned holes therethrough and means including an optical system for ascertaining the vibration of the string by light passing through said holes, said optical system including a microscope extending into and movable in the hole in the magnet, spring means urging the microscope for movement in one direction in said hole, and an adjustable screw stop limiting the movement in said one direction and constituting a means for focusing the microscope.

CHARLES J. GLASSER.

CERTIFICATE OF CORRECTION.

Patent No. 2,300,497.

November 3, 1942.

CHARLES J. GLASSER.

It is hereby certified that error appears in the printed specification of the above numbered patent requiring correction as follows: Page 3, second column, line 40, in the claim, for "strong" read --string--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.